United States Patent

Sasaki et al.

[11] 4,238,429
[45] Dec. 9, 1980

[54] PRILLING PROCESS

[75] Inventors: Susumu Sasaki; Tamikazu Takemota; Shoji Tomita, all of Fujieda, Japan

[73] Assignee: Sumitomo Durez Company, Ltd., Tokyo, Japan

[21] Appl. No.: 960,694

[22] Filed: Nov. 14, 1978

[30] Foreign Application Priority Data

Nov. 25, 1977 [JP] Japan .................. 52-140663

[51] Int. Cl.³ .............................. B01J 2/04
[52] U.S. Cl. ...................... 264/13; 264/14; 425/6
[58] Field of Search .............. 264/13, 14; 425/6

[56] References Cited

U.S. PATENT DOCUMENTS

| 2,898,625 | 8/1959 | Chao | 425/6 |
| 3,642,393 | 2/1972 | Ross et al. | 425/6 |

Primary Examiner—Donald E. Czaja
Assistant Examiner—James R. Hall
Attorney, Agent, or Firm—Peter F. Casella; James F. Mudd

[57] ABSTRACT

A process is provided for making a prilled product from a molten substance wherein steam or heated gas is passed through the nozzle which produces the prilled product prior to the introduction of the molten substance through the nozzle at the beginning of the process.

7 Claims, 1 Drawing Figure

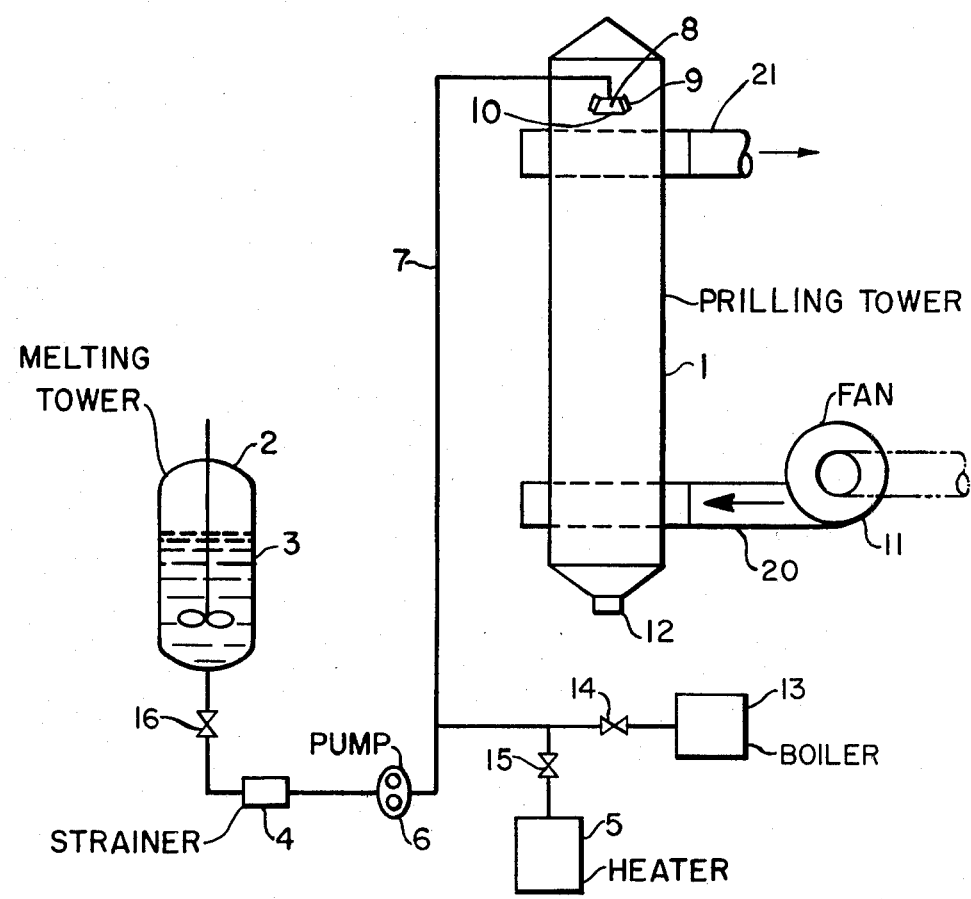

PRILLING PROCESS

BACKGROUND OF THE INVENTION

The present invention relates to an improvement in the melt process for making prills from a melted substance.

Various prilling processes have been proposed for making prills from highly hydroscopic substances such as urea or from substances which are difficult to handle in powder form, thereby improving the flowability, preventing dust generation and decreasing their specific surface. Among these, the principal approach is the melt prilling process, and particularly employed widely is the so-called spray-prilling process in which a melted substance is showered or sprayed from the top of a tower by a nozzle with small holes or orifaces or by centrifugal force with a rotating disc, wherefrom prills are obtained either by drying or solidifying the dropping liquid particles through countercurrent gas introduced from the bottom of tower, or by dropping said liquid particles into a medium inert to said melted substance.

In such a prilling process, smooth passage of the melted substance through the nozzle is indispensable. In this connection pre-heating of the nozzle is indispensable, especially important so as to prevent viscosity increase of the melted substance in the vicinity of the nozzle at the start of the prilling process. In the absence of pre-heating, or in case of insufficient pre-heating, the melted substance present in the vicinity of nozzle is cooled, resulting in a viscosity increase or eventually solidification so as to clog the nozzle and thereby render the operation impossible. In such case, the substance, once it solidifies in the nozzle, does not easily melt not even by forced heating and the nozzle has to be removed for cleaning or replaced by a new nozzle followed by resumed pre-heating before the prilling operation can be started. Also, even if the nozzle is not clogged completely, partial clogging of nozzle will result in the formation of relatively large dripping liquid particles which drop in an unsolidified state and stick to the bottom of the tower. The presence of such adhering unsolidified substance causes reheating by the heat accumulated therein, of other particles completely solidified, thereby resoftening such particles and thus forming a deposit on the bottom of tower, rendering the discharge of prills difficult. It therefore frequently becomes necessary to interrupt the operation and remove the deposit formed on the bottom of tower. Such deposit, being a defective product, not only reduces the yield of production but also hinders continuous operation. Furthermore there may be obtained flat or fiberlike products depending upon the clogged state of the nozzle, since solidification proceeds before the surface tension of liquid particles becomes sufficiently effective.

In general the nozzle is connected to a spray chamber which is heated to maintain the temperature thereof by steam or other suitable heat transfer liquid, but the nozzle is hardly heated by said heating alone. It is to be noted that such heating means is easily available but is difficult to mount on the nozzle itself. However a complete pre-heating of the nozzle is indispensable as explained in the foregoing since the trouble at the start of the prilling process has to be avoided.

Therefore, various methods for pre-heating the nozzle have been proposed, such as:

(1) external pre-heating by infrared irradiation;
(2) external pre-heating by blowing of hot air; and
(3) pre-heating by resistor type heater etc.

However these pre-heating methods, all depending on external heating and mostly utilizing heat of radiation and thus having low heating efficiency which is further reduced by air flow from the bottom of the tower, were unable to exhibit a sufficient heating effect even after a prolonged pre-heating time. Also installation of a heating device within the tower inevitably results in a complicated structure for the prilling apparatus which often affects the prilling operation and renders maintenance cumbersome. Also a heater often results in partial heating of the nozzle which can become a cause of trouble in the prilling operation, and, besides, the use of an inflammable heat source in the tower is not desirable from the standpoint of safety.

The object of the present invention, therefore, is to provide an improved prilling process of high efficiency allowing easy and assured start of prilling, and an economical operation using a simple apparatus.

SUMMARY OF THE INVENTION

According to the present invention, the above-mentioned object is achieved by internally pre-heating the nozzle by introducing steam or heated gas either through a pipe to the top of the tower or directly into the spray chamber at the top of tower.

The present invention is characterized in that the apparatus can be very easily constructed by simply connecting the pipes, that the apparatus does not hinder the prilling operation, and that is provides an assured pre-heating and allows very simple operation and control. Therefore the present inventors have for the first time succeeded in completely eliminating the trouble at the start of operation, thus facilitating continuous operation.

DESCRIPTION OF EMBODIMENTS

The melted substance referred to in the present invention includes concentrated solutions and melted slurries which solidify at ambient temperature or a lower temperature but liquidify at a higher temperature. Examples of such melted substance are organic materials such as wax, paraffin, polyolefins, fatty acids, organic acids, rosins, napththalene, higher alcohols, phthalic anhydride, bisphenol-A, sulfur, urea, phenolic resins, epoxy resins, alkyd resins, petroleum resins, coumarone-indene resins, pitch etc.

Now the prilling process of the present invention will be explained in the following description with reference to the accompanying FIGURE schematically illustrating said prilling process.

In the FIGURE, there are shown prilling tower 1, melting tank 2 for melting a substance, melted substance 3, strainer 4, steam or heated gas generated device 5, pressurizing pump 6, pipe 7, spray chamber 8, heating jacket 9 having heating means (not shown), plate nozzle 10, fan 11 and discharge outlet 12 boiler 13, steam supply valve 14, gas supply valve 15 and melting tank discharge valve 16, air inlet conduit 20 and air outlet conduit 21.

According to the present invention in which the nozzle is internally heated by steam or heated gas, the introduction of said steam or heated gas may be conducted at any arbitrary position, but, in consideration of the ease of operation and of the structure, said introduction is performed either through the strainer located at the bottom of the tower or from the upper portion of the spray chamber located at the top of the tower. The pressure of steam or temperature of heated gas is determined according to the species of the melted substance, but, in the case of steam, a pressure range of 2.5 to 11 kg/cm$^2$G is preferable, particularly of 5 to 8 kg/cm$^2$G, while in the case of heated gas a temperature range of 110° to 200° C. is preferred. Said heated gas is preferably composed of an inert gas so as not to deteriorate the melted substance, but air is also usable for this purpose. Also said heated gas shall be provided with pressure for enough flow to heat the nozzle, for example 1 to 5 kg/cm$^2$G. Upon completion of nozzle pre-heating, the introduction of steam or heated gas is immediately terminated and the melted substance is supplied under pressure by a pump and sprayed through the nozzle to initiate prill formation. In this manner the melted substance is converted into droplets which are formed into prills by surface tension and solidified by cooling before reaching the bottom of the tower.

The nozzle referred to in the present invention includes an ordinary pressurized nozzle, a two-fluid nozzle, a plate nozzle provided with numerous small holes and obtaining a spray by gravity or by additional pressure, and a rotary disc nozzle.

The process of the present invention will be further clarified by the following non-limitative example thereof, wherein reference is made to the apparatus depicted in the FIGURE.

EXAMPLE

A petroleum resin (Escorez 1102B; Esso) was melted and heated to 230° C. in melting tank 2, in which the free space was filled with nitrogen gas to prevent deterioration of said resin. Fan 11 was actuated to send an air flow of 20° C. from the bottom toward the top of tower. Also the strainer, pipe and spray chamber were heated to maintain a desired temperature. Successively the plate nozzle provided with 25 small orifices was pre-heated by introducing steam of 7 kg/cm$^2$G through pipe 7 to the top of the tower. Because of the use of steam in this example, a trough (not shown) was provided under the plate nozzle to receive the water drops condensed thereunder, thereby preventing water drops from reaching the bottom of the tower. After pre-heating with steam which passes from boiler 13 through steam supply valve 14, for 7 minutes, the steam supply valve 14 was closed and a gas (air) heated to 170° C. was introduced from heater 5 through gas supply valve 15 for 4 minutes. Thereafter the gas supply valve 15 was closed and the valve 16 of the melting tank was opened to initiate the feeding of melted petroleum resin. The resin passed through the heated strainer (80 mesh), then pressurized by the pump and transported to the top of the tower through the heated pipe. In the spray chamber connected to said pipe, the melted resin was made to flow down through the plate nozzle to initiate prill formation. At the bottom of tower there were obtained prills of which 70–80% was composed of prills of 10–20 mesh size. The free fall distance of prills was 18 m. The possible trouble at the start of prilling operation, such as nozzle clogging, deposit formation on the bottom of tower, uneven prill sizes, formation of fiber-like product etc. were practically not observed in the experiments repeated seven times.

On the other hand, by the same prilling process initiated without nozzle pre-heating, prills could not be produced because of nozzle clogging. Also in case of pre-heating with an infrared heater and a resistor type heater for 50 minutes, smooth operation without nozzle clogging and also without deposit formation at the bottom was obtained only in two experiments out of five times repeated.

The present invention can be used in connection with the invention disclosed in applications entitled "Prilling Process and Apparatus Therefor", Ser. No. 960,549, and "Process for Making Prills from Melted Substance and Apparatus Therefor", Ser. No. 960,692, all filed on even date herewith, the disclosures of which are incorporated herein by reference.

We claim:

1. In a process for making a prilled product comprising:
   (a) passing an organic molten substance through a conduit to a spray chamber disposed in the upper portion of a prilling zone, and then through an orifice in a nozzle in said spray chamber, and
   (b) solidifying the resulting droplets of molten substance as said droplets fall through said prilling zone, the improvement which comprises:
   (c) internally pre-heating the nozzle with steam or heated gas or a combination thereof prior to introduction of the molten substance to the nozzle at the beginning of the process.

2. The process of claim 1 wherein the nozzle is internally pre-heated by introducing steam or heated gas or a combination thereof through the conduit which normally feeds molten substance to the nozzle.

3. The process of claim 1 wherein the nozzle is internally pre-heated by introducing steam or heated gas or a combination thereof into said spray chamber.

4. The process of claim 1 wherein steam is employed having a pressure in the range of 2.5 to 11 kg/cm$^2$G.

5. The process of claim 1 wherein heated gas is employed having a temperature of about 110° C. to 200° C.

6. The process of claim 5 wherein said heated gas is inert.

7. The process of claim 5 wherein said heated gas is air.

* * * * *